(12) United States Patent
Matsumiya et al.

(10) Patent No.: US 6,671,571 B1
(45) Date of Patent: Dec. 30, 2003

(54) METHOD FOR NC- PROGRAMMING AND SYSTEM FOR NC- MACHINING

(75) Inventors: Sadayuki Matsumiya, Kawasaki (JP); Naoki Morita, Yamatokoriyama (JP); Yasushi Fukaya, Niwa-gun (JP); Kazuo Yamazaki, 44204 Greenview Dr., El Macero, CA (US) 95618

(73) Assignees: Mitutoyo Corporation, Kawasaki (JP); Mori Seiki Co., Ltd., Yamatokoriyama (JP); Okúma Corporation, Nagoya (JP); Kazuo Yamazaki, El Macero, CA (US)

( * ) Notice: Subject to any disclaimer, the term of this patent is extended or adjusted under 35 U.S.C. 154(b) by 0 days.

(21) Appl. No.: 09/763,437

(22) PCT Filed: Jul. 5, 1999

(86) PCT No.: PCT/JP99/03618

§ 371 (c)(1),
(2), (4) Date: Feb. 23, 2001

(87) PCT Pub. No.: WO01/02914

PCT Pub. Date: Jan. 11, 2001

(51) Int. Cl.[7] .......................... G05B 15/00; G06F 19/00
(52) U.S. Cl. ..................... 700/172; 700/86; 700/174; 702/82; 702/155
(58) Field of Search .................. 700/86, 175, 174; 702/82, 155

(56) References Cited

U.S. PATENT DOCUMENTS

| 4,977,531 | A | * | 12/1990 | Ogata et al. | 702/119 |
|---|---|---|---|---|---|
| 5,029,068 | A | * | 7/1991 | Miyata et al. | 700/86 |
| 5,288,209 | A | * | 2/1994 | Therrien et al. | 416/193 R |
| 5,291,393 | A | * | 3/1994 | Matsumoto et al. | 700/86 |
| 5,378,218 | A | * | 1/1995 | Daimaru et al. | 483/9 |
| 5,552,688 | A | * | 9/1996 | Haga | 318/569 |
| 5,608,641 | A | * | 3/1997 | Guhl et al. | 700/185 |
| 5,827,020 | A | * | 10/1998 | Fujita et al. | 409/80 |
| 6,397,123 | B1 | * | 5/2002 | Miyajima et al. | 700/160 |
| 6,400,998 | B1 | * | 6/2002 | Yamazaki et al. | 700/86 |
| 6,401,004 | B1 | * | 6/2002 | Yamazaki et al. | 700/159 |
| 6,415,191 | B1 | * | 7/2002 | Pryor | 700/95 |
| 6,493,594 | B1 | * | 12/2002 | Kraml | 700/19 |

FOREIGN PATENT DOCUMENTS

| JP | 4-138504 | 5/1992 |
|---|---|---|
| JP | 5-92349 | 4/1993 |
| JP | 10-258372 | 9/1998 |
| WO | WO 98/19821 | 5/1998 |

* cited by examiner

*Primary Examiner*—Leo Picard
*Assistant Examiner*—Elliot Frank
(74) *Attorney, Agent, or Firm*—Oliff & Berridge, PLC

(57) ABSTRACT

In the present invention, for an NC program for controlling a machine tool, information for machining quality required by a machine tool is prewritten in the program. A measurement program for measuring the machining quality of the workpiece using a measuring machine is produced by analyzing the NC program. The machining quality of the workpiece is measured by the measurement program and the measuring machine. The machining quality of the workpiece can be judged by comparing the measurement results and the machining quality information included in the NC program. By utilizing this quality judgement, simple and effective system control can be achieved when a system such as CIM (Computer Integrated Manufacturing) is constructed in cooperation with other machine tools.

8 Claims, 12 Drawing Sheets

Fig. 4A

EXAMPLE OF NC MACHINING PROGRAM HAVING TOLERANCE INFORMATION

| No. | PROGRAM | NOTE |
|---|---|---|
| 1 | 0 0001 | |
| 2 | G90 G80 G40 | |
| 3 | G91 G28 Z0 | |
| 4 | T1 | |
| 5 | M6 | |
| 6 | N1 (FACE MILL 100mm DIA.) | |
| 7 | G90 G54 G0 X160. Y50. S400 M3 T2 | |
| 8 | G43 Z50. H1 M8 | |
| 9 | G1 Z. 1 F2000 | |
| 10 | X-160. F250 | |
| 11 | G0 Y-45. | |
| 12 | G1 X160. | |
| 13 | G0 Y50. S600 | |
| 14 | G1 Z0 | |
| 15 | X-160. F400 | |
| 16 | G0 Y-45. | |
| 17 | G1 X160. | |
| 18 | G0 Z100 | |
| 19 | G55 G0 X160. Y50. S400 | |
| 20 | Z50. | |
| 21 | G1 Z. 1 F2000 | |
| 22 | X-160. F250 | |
| 23 | G0 Y-45. | |
| 24 | G1 X-160. | |
| 25 | G0 Y-50. S600 | |
| 26 | G1 Z0 | |
| 27 | X-160. F400 | |
| 28 | G0 Y-45. | |
| 29 | G1 X160. | |
| 30 | G0 Z50. M9 | |
| 31 | G91 G28 Z0 M6 | |
| 32 | M1 | |
| 33 | N2(CENTER DRILL) | |
| 34 | G90 G54 G0 X70. Y50. S1000 M3 T3 | |
| 35 | G43 Z50. H2 M8 | |
| 36 | G99 G81 Z-3. R2. F100 | |
| 37 | X-70. | |
| 38 | Y-50. | |
| 39 | X70. | |
| 40 | X30. Y0 | |

Fig. 4B

EXAMPLE OF NC MACHINING PROGRAM HAVING TOLERANCE INFORMATION

| No. | PROGRAM | NOTE |
|---|---|---|
| 41 | G0 Z100. | |
| 42 | G90 G55 G0 X40. Y0 | |
| 43 | Z50. | |
| 44 | G99 G81 Z-3. R2. F100 | |
| 45 | X-40. | |
| 46 | G0 Z50. M9 | |
| 47 | G91 G28 Z0 M6 | |
| 48 | M1 | |
| 49 | N3(DRILL 20mm DIA.) | |
| 50 | /TOL X:0.02, -0.02 | TOLERANCE INFORMATION OF UPPER AND LOWER LIMIT VALUE FOR X |
| 51 | /TOL Y:0.02, -0.02 | TOLERANCE INFORMATION OF UPPER AND LOWER LIMIT VALUE FOR Y |
| 52 | /TOL D:0.05, -0.05 | TOLERANCE INFORMATION OF UPPER AND LOWER LIMIT VALUE FOR D |
| 53 | G90 G54 G0 X70. Y50. S400 M3 T4 | |
| 54 | G43 G50. H3 M8 | |
| 55 | G99 G81 Z-25. R2. F80 | MACHINING COMMAND FOR CONVERSION TO #1 MEASUREMENT COMMAND |
| 56 | X-70. | MACHINING COMMAND FOR CONVERSION TO #2 MEASUREMENT COMMAND |
| 57 | Y-50. | MACHINING COMMAND FOR CONVERSION TO #3 MEASUREMENT COMMAND |
| 58 | /TOL X:0.01, -0.01 | TOLERANCE INFORMATION OF UPPER AND LOWER LIMIT VALUE FOR X |
| 59 | /TOL Y:0.01, -0.01 | TOLERANCE INFORMATION OF UPPER AND LOWER LIMIT VALUE FOR Y |
| 60 | /TOL D:0.03, -0.03 | TOLERANCE INFORMATION OF UPPER AND LOWER LIMIT VALUE FOR D |
| 61 | X70. | MACHINING COMMAND FOR CONVERSION TO #4 MEASUREMENT COMMAND |

Fig. 7

00001 TOOL LIST

| NAME OF TOOL | NAME OF MANUFAC- TURER | TYPE OF HOLDER | TYPE OF TIP | MATERIAL OF TIP | NOMINAL DIAMETER | T- CODE | H- CODE | D- CODE | NUMBER OF CUTT- ING EDGES | LENGTH OF CUTT- ING EDGES | PROJECT- ING LENGTH | PITCH | ANGLE |
|---|---|---|---|---|---|---|---|---|---|---|---|---|---|
| FACE MILL | ABC CO. | A-01 | B-01 | CEMENTED CARBIDE | 100.000 | 1 | 1 | 1 | 6 | 10.000 | 20.000 | — | 90 |
| CENTER DRILL | ABC CO. | A-02 | B-02 | HIGH SPEED STEEL | 3.000 | 2 | 2 | 2 | — | 5.000 | 20.000 | — | 60 |
| DRILL | ABC CO. | A-03 | B-03 | HIGH SPEED STEEL | 20.000 | 3 | 3 | 3 | — | 150.000 | 160.000 | — | 118 |
| DRILL | ABC CO. | A-04 | B-04 | HIGH SPEED STEEL | 30.000 | 4 | 4 | 4 | — | 150.000 | 160.000 | — | 118 |
| END MILL | ABC CO. | A-05 | B-05 | HIGH SPEED STEEL | 25.000 | 5 | 5 | 5 | 2 | 50.000 | 50.000 | — | — |
| END MILL | ABC CO. | A-06 | B-06 | HIGH SPEED STEEL | 25.000 | 6 | 6 | 6 | 2 | 35.000 | 50.000 | — | — |
| DRILL | ABC CO. | A-07 | B-07 | HIGH SPEED STEEL | 8.200 | 7 | 7 | 7 | — | 50.000 | 100.000 | — | 118 |
| CHAMFER | ABC CO. | A-08 | B-08 | HIGH SPEED STEEL | 25.000 | 8 | 8 | 8 | 2 | 10.000 | 80.000 | — | 45 |
| TAP | ABC CO. | A-09 | B-09 | HIGH SPEED STEEL | M10 | 9 | 9 | 9 | — | 30.000 | 50.000 | 1.25 | 45 |

Fig. 8A

EXAMPLE OF MEASUREMENT PROGRAM FOR THREE-DIMENSIONAL COORDINATE MEASURING MACHINE PRODUCED FROM NC MACHINING PROGRAM HAVING TOLERANCE INFORMATION

| No. | PROGRAM | NOTE |
|---|---|---|
| 1 | DMISMN/'GPKPart | |
| 2 | MODE/PROG, MAN | |
| 3 | UNITS/MM, ANGDEC | |
| 4 | WKPLAN/XYPLAN | |
| 5 | F(PLA_1)=FEAT/PLANE, CART, 0. 0, 0. 0, 0. 0, 0. 0, 0. 0, 1. 0 | |
| 6 | MEAS/PLANE, F(PLA_1), 3 | |
| 7 | PTMEAS/CART, -1. 00000, 0. 00000, 0. 00000, 0. 00000, 0. 00000, -1. 00000 | |
| 8 | PTMEAS/CART, -0. 50000, 0. 86603, 0. 00000, 0. 00000, 0. 00000, -1. 00000 | |
| 9 | PTMEAS/CART, -0. 50000, -0. 86603, 0. 00000, 0. 00000, 0. 00000, -1. 00000 | |
| 10 | ENDMES | |
| 11 | DETDEF/FA(PLA_1), DAT(A) | |
| 12 | D(BPLANE)=DATSET/DAT(A), ZDIR, ZORIG | |
| 13 | F(LIN_1)=FEAT/LINE, UNBND, CART, 0. 0, 0. 0, 0. 0, 1, 0, 0. 0, 0, -1, 0. 0 | |
| 14 | MEAS/LINE, F(LIN_1), 2 | |
| 15 | GOTO/0.00000, -20. 00000, 0. 00000 | |
| 16 | PTMEAS/CART, 0. 00000, 0. 00000, 3. 00000, 0. 00000, -1. 00000, 0. 00000 | |
| 17 | PTMEAS/CART, -1. 00000, 0. 00000, 3. 00000, 0. 00000, -1. 00000, 0. 00000 | |
| 18 | ENDMES | |
| 19 | D(DRAXIS)=ROTATE/ZAXIS, FA(LIN_1), XDIR | |
| 20 | F(PNT_1)=FEAT/POINT, CART, 0, 20, 0. 0, 0. 0, -1, 0 | |
| 21 | MEAS/POINT, F(PNT_1), 1 | |
| 22 | PTMEAS/CART, 0. 00000, 20. 00000, 0. 00000, 0. 00000, -1. 00000, 0. 00000 | |
| 23 | ENDMES | |
| 24 | F(PNT_2)=FEAT/POINT, CART, 0, -20, 0. 0, 0. 0, 1, 0 | |
| 25 | MEAS/POINT, F(PNT_2), 1 | |
| 26 | PTMEAS/CART, 0. 00000, -20. 00000, 0. 00000, 0. 00000, -1. 00000, 0. 00000 | |
| 27 | ENDMES | |
| 28 | F(CPt_1)=FEAT/POINT, CART, 0. 0, 0. 0, 0. 0, 0. 0, 0. 0, 1. 0 | |
| 29 | CONST/POINT, F(CPT_1), MIDPT, FA(PNT_2), FA(PNT_1) | |
| 30 | D(DORIGN)=TRANS/YORIG, FA(CPT_1) | |
| 31 | F(CIR_1)=FEAT/CIRCLE, INNER, CART, 30, 0. 0, 0. 0, 0. 0, 0. 0, 1. 0, 20 | |
| 32 | MEAS/CIRCLE, F(CIR_1), 3 | |
| 33 | GOTO/30.00000, 0. 00000, 20. 00000 | |
| 34 | PTMEAS/CART, 50. 00000, 0. 00000, -3. 00000, -1. 00000, 0. 00000, 0. 00000 | |
| 35 | PTMEAS/CART, 20. 00000, 17. 32051, -3. 00000, -0. 50000, 0. 86603, 0. 00000 | |
| 36 | PTMEAS/CART, 20. 00000, -17. 32051, -3. 00000, -0. 50000, -0. 86603, 0. 00000 | |
| 37 | GOTO/30.00000, 0. 00000, 20. 00000 | |
| 38 | ENDMES | |
| 39 | F(CIR_2)=FEAT/CIRCLE, INNER, CART, -30, 0. 0, 0. 0, 0. 0, 0. 0, 1. 0, 20 | |
| 40 | MEAS/CIRCLE, F(CIR_2), 3 | |
| 41 | GOTO/-30.00000, 0. 00000, 20. 00000 | |
| 42 | PTMEAS/CART, -10. 00000, 0. 00000, -3. 00000, -1. 00000, 0. 00000, 0. 00000 | |
| 43 | PTMEAS/CART, -40. 00000, 17. 32051, -3. 00000, -0. 50000, 0. 86603, 0. 00000 | |
| 44 | PTMEAS/CART, -40. 00000, -17. 32051, -3. 00000, -0. 50000, -0. 86603, 0. 00000 | |
| 45 | GOTO/-30.00000, 0. 00000, 20. 00000 | |
| 46 | ENDMES | |
| 47 | F(CPt_2)=FEAT/POINT, CART, 0. 0, 0. 0, 0. 0, 0. 0, 0. 0, 1.0 | |
| 48 | CONST/POINT, F(CPT_2), MIDPT, FA(CIR_1), FA(CIR_2) | |
| 49 | D(DORIGN)=TRANS/XORIG, FA(CPT_2) | |

Fig. 8B

EXAMPLE OF MEASUREMENT PROGRAM FOR THREE-DIMENSIONAL COORDINATE MEASURING MACHINE PRODUCED FROM NC MACHINING PROGRAM HAVING TOLERANCE INFORMATION

| No. | PROGRAM | NOTE |
|---|---|---|
| 50 | F(CIR_3)=FEAT/CIRCLE, INNER, CART, 50, 70, 0. 0, 0. 0, 0. 0, 1. 0, 10 | |
| 51 | MEAS/CIRCLE, F(CIR_3), 4 | |
| 52 | GOTO/50. 00000, 70.00000, 20.00000 | |
| 53 | PTMEAS/CART, 60. 00000, 70. 00000, -3. 00000, -1. 00000, 0. 00000, 0. 00000 | |
| 54 | PTMEAS/CART, 50. 00000, 80. 00000, -3. 00000, 0. 00000, -1. 00000, 0. 00000 | |
| 55 | PTMEAS/CART, 40. 00000, 70. 00000, -3. 00000, -1. 00000, 0. 00000, 0. 00000 | |
| 56 | PTMEAS/CART, 50. 00000, 60. 00000, -3. 00000, -0. 00000, -1. 00000, 0. 00000 | MEASUREMENT OF HOLE #1 |
| 57 | GOTO/50.00000, 70. 00000, 20. 00000 | |
| 58 | ENDMES | |
| 59 | T(TOLXO)=TOL/CORTOL, XAXIS, -0. 02, 0. 02 | AUTOMATICALLY PRODUCED TOLERANCES OF X, Y, D |
| 60 | T(TDIAO)=TOL/DIAM, -0. 05, 0. 05 | |
| 61 | T(TOLYO)=TOL/CORTOL, YAXIS, -0. 02, 0. 02 | |
| 62 | OUTPUT/FA(CIR_3), T(TOLXO), T(TOLYO), T(TDIAO) ............... | |
| 63 | F(CIR_4)=FEAT/CIRCLE, INNER, CART, -50, 70, 0. 0, 0. 0, 0. 0, 1. 0, 10 | |
| 64 | MEAS/CIRCLE, F(CIR_4), 4 | |
| 65 | GOTO/-50. 00000, 70.00000, 20.00000 | |
| 66 | PTMEAS/CART, -40. 00000, 70. 00000, -3. 00000, -1. 00000, 0. 00000, 0. 00000 | |
| 67 | PTMEAS/CART, -50. 00000, 80. 00000, -3. 00000, 0. 00000, -1. 00000, 0. 00000 | |
| 68 | PTMEAS/CART, -60. 00000, 70. 00000, -3. 00000, -1. 00000, 0. 00000, 0. 00000 | |
| 69 | PTMEAS/CART, -50. 00000, 60. 00000, -3. 00000, -0. 00000, -1. 00000, 0. 00000 | MEASUREMENT OF HOLE #2 |
| 70 | GOTO/-50. 00000, 70.00000, 20.00000 | |
| 71 | ENDMES | |
| 72 | T(TOLX1)=TOL/CORTOL, XAXIS, -0. 02, 0. 02 | AUTOMATICALLY PRODUCED TOLERANCES OF X, Y, D |
| 73 | T(TOLY1)=TOL/CORTOL, YAXIS, -0. 02, 0. 02 | |
| 74 | T(TDIA1)=TOL/DIAM, -0. 05, 0. 05 | |
| 75 | OUTPUT/FA(CIR_4), TA(TOLX1), TA(TOLY1), TA(TDIA1) ............... | |
| 76 | F(CIR_5)=FEAT/CIRCLE, INNER, CART, -50, -70, 0. 0, 0. 0, 0. 0, 1. 0, 10 | |
| 77 | MEAS/CIRCLE, F(CIR_5), 4 | |
| 78 | GOTO/-50. 00000, -70.00000, 20.00000 | |
| 79 | PTMEAS/CART, -40. 00000, -70. 00000, -3. 00000, -1. 00000, 0. 00000, 0. 00000 | |
| 80 | PTMEAS/CART, -50. 00000, -60. 00000, -3. 00000, 0. 00000, -1. 00000, 0. 00000 | |
| 81 | PTMEAS/CART, -60. 00000, -70. 00000, -3. 00000, -1. 00000, 0. 00000, 0. 00000 | |
| 82 | PTMEAS/CART, -50. 00000, -80. 00000, -3. 00000, -0. 00000, -1. 00000, 0. 00000 | MEASUREMENT OF HOLE #3 |
| 83 | GOTO/-50. 00000, -70.00000, 20.00000 | |
| 84 | ENDMES | |
| 85 | T(TOLX2)=TOL/CORTOL, XAXIS, -0. 02, 0. 02 | AUTOMATICALLY PRODUCED TOLERANCES OF X, Y, D |
| 86 | T(TOLY2)=TOL/CORTOL, YAXIS, -0. 02, 0. 02 | |
| 87 | T(TDIA1)=TOL/DIAM, -0. 05, 0. 05 | |
| 88 | OUTPUT/FA(CIR_5), TA(TOLX2), TA(TOLY2), TA(TDIA2) ............... | |
| 89 | F(CIR_6)=FEAT/CIRCLE, INNER, CART, 50, -70, 0. 0, 0. 0, 0. 0, 1. 0, 10 | |
| 90 | MEAS/CIRCLE, F(CIR_6), 4 | |
| 91 | GOTO/50. 00000, -70.00000, 20.00000 | |
| 92 | PTMEAS/CART, 60. 00000, -70. 00000, -3. 00000, -1. 00000, 0. 00000, 0. 00000 | |
| 93 | PTMEAS/CART, 50. 00000, -60. 00000, -3. 00000, 0. 00000, -1. 00000, 0. 00000 | |
| 94 | PTMEAS/CART, 40. 00000, -70. 00000, -3. 00000, -1. 00000, 0. 00000, 0. 00000 | |
| 95 | PTMEAS/CART, 50. 00000, -80. 00000, -3. 00000, -0. 00000, -1. 00000, 0. 00000 | MEASUREMENT OF HOLE #4 |
| 96 | GOTO/50. 00000, -70.00000, 20.00000 | |
| 97 | ENDMES | |
| 98 | T(TOLX3)=TOL/CORTOL, XAXIS, -0. 01, 0. 01 | AUTOMATICALLY PRODUCED TOLERANCES OF X, Y, D |
| 99 | T(TOLY3)=TOL/CORTOL, YAXIS, -0. 01, 0. 01 | |
| 100 | T(TDIA3)=TOL/DIAM, YAXIS, -0. 03, 0. 03 | |
| 101 | OUTPUT/FA(CIR_6), TA(TOLX3), TA(TOLY3), TA(TDIA3) ............... | |

METHOD FOR NC- PROGRAMMING AND SYSTEM FOR NC- MACHINING

TECHNICAL FIELD

The present invention relates to a method for producing a measurement program for measuring machining quality in an NC machining process in order to realize an effective NC machining system, and to an NC machining system utilizing the measurement results of the machining quality of the workpieces obtained by using the measurement program produced by this method.

BACKGROUND ART

With an NC machine tool, tool movement can be automatically controlled by an input NC program. In addition, in recent years, NC machine tools have come to be widely used in various industrial fields as computerized numerical control machines (CNC machine tools) in combination with advanced technology such as advanced microprocessor, power electronics, or software technology.

Typically, numerical control information such as an NC program includes individual information such as a tool indexing command, a main-spindle speed command, a feed-rate command, a traverse and interpolation command, an auxiliary function command and the like and a working history, and is formed as an NC program so as to be suitable for a machine tool that is a controlled system in machining.

NC programs produced in this manner are used in various machining processes. In order to perform high quality machining, it is necessary to measure the workpiece after a final machining process or at intermediate machining processes and to modify the machining control for the next workpiece or the following machining processes for the same workpiece according to the measured results. Conventionally, measurement is carried out so that sizes of the workpieces are partially measured at intermediate machining processes using simple instruments such as a micrometer or vernier calipers, and then all significant measurements of the workpieces are assessed in a final inspection. When there are any problems concerning the measured results, such a situation is fed back to the NC machining. This feedback of measured results to the machining control is carried out by experienced skilled workmen through oral or memo communication between the workmen. Consequently, with conventional systems it is not possible to automatically feedback the measured results to the machining control in real time.

Moreover, because in conventional simple measurement only limited measurements are made during the machining process, a final inspection is required for precise measurement. Therefore, there are disadvantages in that recognition of the problems is delayed and that the yield of the NC machining is lowered.

In order to solve such problems, an automatic measurement programming method has been proposed in which measurement programs for the finally finished workpieces or for the intermediate processes are prepared in advance, and the measurements are automatically and sequentially carried out during NC machining using an instrument such as a three-dimensional coordinate measuring machine or the like, and the measured results are fed back to the NC machining. According to such art, the measurement itself can quickly and accurately be carried out without relying upon skilled workmen.

However, such a conventional automatic programming requires complicated operations by a CAD/CAM system based on material data, final machined shapes, tool data, and the like. Therefore, there remain problems that the conventional automatic programming cannot be utilized in all NC machining processes, and that a large scale facility is required. This method is therefore rarely utilized only in certain cases where mass production is performed using one NC program.

There are further disadvantages in that a measurement program by an automatic programming is produced based on final shape data of a product, in particular working drawings, and that therefore the measurement program is not optimized for workpiece shapes during intermediate stages of each operation element, working element, or process during execution of an actual NC program.

The expression "working element" employed herein is defined as a group of a plurality of operation elements for the same machining position of a workpiece. In other words, the operation element is a single machining operation executed by each tool, for example, a single operation such as drilling, milling. Working element refers to a combined operation for completing machining for the same machining position of the workpiece by combining a plurality of operation elements. For example, in the case of machining a threaded hole, the working element is defined as the element composed of three operation elements such as center hole drilling, drilling of a hole before threading, and tapping. In addition, process refers to all of the groups of a series of machining operations to be carried out in the same chucking attitude of a workpiece on a machine tool.

In recent years, it has become common in NC machining to use NC programs that are open and flexible as far as possible. In actual machining, the NC program is often re-edited and modified to pursue an optimum machining method. In addition, NC programs are commonly modularized, or made flexible in order to achieve free modification. As a result, there is such a problem that a conventional machining program simply produced based on a working drawing cannot cope with the respective actual stages of the operation elements, working elements or processes, and cannot be used with advanced NC machine tools.

Furthermore, in recent years, advanced NC machining has come to be performed out not only by a single machine tool, but also by CIM (Computer Integrated Manufacturing) system coordinating a number of machine tools. In such cases, there is also such a problem that a conventional non-flexible measurement program cannot be imparted with learning ability to cope with the application to other machine tools or the application to new machine tools.

In an attempt to deal with such a problem, technology such as disclosed in PCT/JP96/03265 is proposed. However, while many of the problems described above are addressed by that technology, there remains many possible improvements for more efficiently producing a measurement program. The object of the present invention is to provide a new method and system for improving this technology.

DISCLOSURE OF THE INVENTION

A method for producing an NC program according to the present invention in order to achieve the object describe above is characterized in that machining quality information concerning the machining quality after machining a workpiece is written in the NC program. The machining quality information includes information on the tolerance and surface roughness required of the workpiece after machining.

In addition, the NC machining system according to the present invention may comprise the steps of producing a measurement program for measuring machining quality of a workpiece machined using a machine tool by a measuring machine through analyzing the NC program produced according to the method described above; measuring the machining quality of the workpiece using the produced measurement program and the measuring machine; and discriminating the machining quality of the workpiece by comparing the results of the machining quality of the workpiece measured by the measuring machine and the required machining quality information included in the NC program.

Furthermore, the NC machining apparatus according to the present invention may comprise measurement program producing means for producing a measurement program for measuring machining quality of the workpiece machined using a machine tool by a measuring machine through analyzing the NC program for executing a machining control of the machine tool for the workpiece; a measuring machine for measuring the machining quality of the workpiece using the produced measurement program; and discriminating means for discriminating the machining quality of the workpiece by comparing the results of the machining quality of the workpiece measured by the measuring machine and the required machining quality information included in the NC program.

BRIEF DESCRIPTION OF DRAWINGS

FIG. 4A and FIG. 4B are examples of code for actual machining NC programs used in the embodiments of the present invention.

FIG. 7 is a figure showing a tool list used to illustrate the preferred embodiment.

FIG. 8A and FIG. 8B are figures showing a part of a measurement program derived from the actual machining NC program of FIG. 4A and FIG. 4B according to the preferred embodiment.

BEST MODE FOR CARRYING OUT THE INVENTION

A preferable embodiment of the present invention will be described in detail with reference to the drawings.

Figure 1:
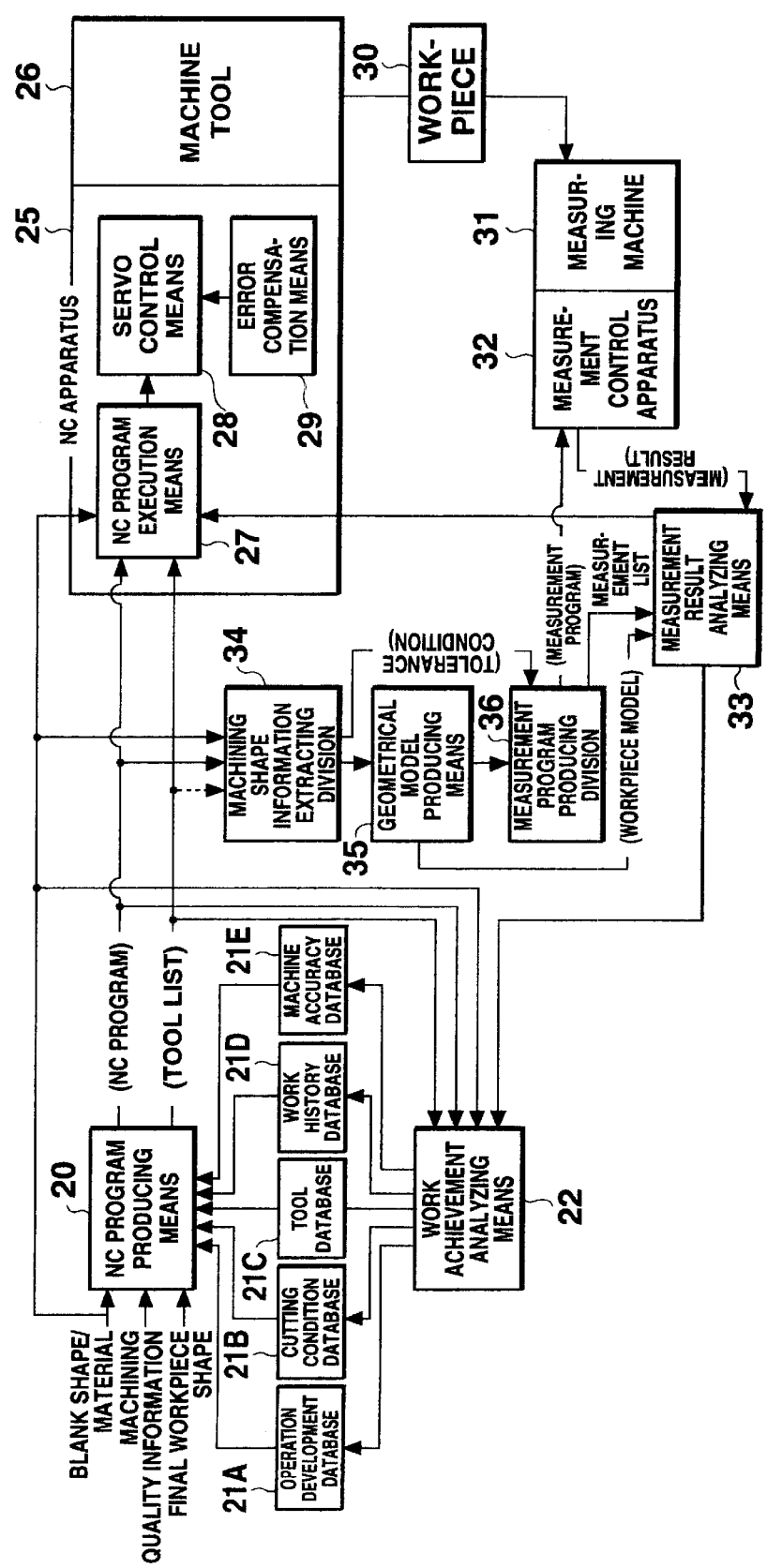
FIG. 1 is a block diagram showing the overall configuration of an NC system including the measurement program production and machining control according to the present invention.

FIG. 1 shows the overall configuration of the NC machine tool system incorporating the measurement program producing method and the process management method according to the present invention.

An NC program producing means 20 produces an NC program based on blank (or workpiece) data, a final workpiece shape, and required quality information. This NC program is characterized in that quality information such as tolerances at various stages of machining each operation element, working element machining, and process machining for the workpiece is written in the program differently from a conventional NC program.

The NC program producing means 20 produces a required NC program based on, in addition to the input blank data, final workpiece shape, and required quality information, data for accumulated know-how obtained from various databases. In the example of the present embodiment, the blank data include shapes and materials of blanks. In the embodiment shown in FIG. 1, the databases comprise an operation development database 21A, a cutting condition database 21B, a tool database 21C, a working history database 21D, and a machine accuracy database 21E. From each of these databases, conditions necessary for actual machining operations such as past know-how in a machining shop, specifications of the machine shop, conditions particular to the employed machine tools, and the like are supplied to the NC program producing means 20 as reference data for use in creating the NC program.

The NC program and the tool list created in such a manner are supplied to an NC apparatus 25. Necessary idle operations, test cutting or simulations are performed. Then, an actual machining NC program to be used finally in a machining shop using the NC apparatus 25 is completed after modifying and re-editing of the NC program (not shown).

The NC apparatus 25 comprises an NC program execution means 27, a servo control means 28, and an error compensation means 29 to drive a machine tool 26. The NC program, the tool list, and the blank data are input into the NC program execution means 27. The NC program execution means 27 executes interpolation processing by the respective input data based on an appropriate feedrate and while referring to the measured results, as will be described below, and supplies a servo control signal to the servo control means 28. Thus, the machine tool 26 can be controlled in a feed drive control by the drive signal output from the servo control means 28 so as to accurately fit the NC program. The error compensation means 29 is provided to compensate for size and position errors due to temperature change or the like in the machine tool 26, and can compensate for such errors based upon an output signal of a measuring instrument mounted on the machine tool 26.

In the manner described above, the machine tool 26 executes desired operation element machining, working element machining, and process machining for a workpiece 30 mounted on a worktable, and completes the machining in the first chucking attitude of the workpiece 30.

When the process machining for the workpiece 30 in the first chucking attitude has been completed, a measuring machine 31 executes coordinate measurement of the workpiece 30 according to the measurement program of a measurement control apparatus 32. The measured results are fed back to the NC program execution means 27 of the NC apparatus 25 in the next process via a measurement result analyzing means 33, and are supplied to the respective databases, 21A, 21B, 21C, 21D, and 21E, as necessary. When the quality information of the NC program includes not only information obtained from the coordinate measurement such as required tolerances, but also information about required surface roughness of the machined surface, information for executing the surface roughness measurement of the machined surface is written into the measurement program for the measurement control apparatus, and the surface roughness measurement of the machined surface is carried out by the measuring machine 31.

Thus, according to the embodiment shown in FIG. 1, desired NC machining can be performed on the workpiece 30 based on the produced NC program. When the process machining for the workpiece 30 in the first chucking attitude has been finished, the workpiece is re-chucked for the second attitude, and similar machining operations are successively carried out in the second chucking attitude according to the NC program.

In the present invention, the measurement program to be supplied to the measurement control apparatus 32 is produced from the actual machining NC program to be supplied to the NC apparatus 25. In order to realize the advantages of the present invention, a machining shape information extracting division 34, a geometrical model producing division 35, and a measurement program producing division 36 are provided.

The tool list and the actual machining NC program output from the NC program producing means 20 are supplied to the machining shape information extracting division 34. The machining shape information extracting division 34 extracts machining shape information at appropriate stages of the machining of each operation element, working element, or process on the basis of these input data by analyzing the actual machining NC program. The extracted machining shape information is converted into a three-dimensional geometrical element, or to a geometrical model, at selected stages in the geometrical model producing division 35. The measurement program producing division 36 can produce an optimum measurement program for the geometrical element, or a geometrical model by selecting a predetermined measurement path. Furthermore, the machining shape information extracting division 34 extracts the quality information from the actual machining NC program and directly outputs the quality information to the measurement program producing division 36.

It can be clearly seen from FIG. 1 that the measurement program produced in such a manner is supplied to the measurement control apparatus 32, that the geometrical model produced in the geometrical model producing division 35 is supplied to the measurement result analyzing means 33, and also that the measurement list output from the measurement program producing division 36 is similarly supplied to the measurement result analyzing means 33. In the present invention, not just the tool list and the NC program described above, but also the blank data and the final workpiece shape may be supplied to the machining shape information extracting division 34. It is thereby possible to further simply and accurately determine, for example, a travelling path of a measuring probe, or the like.

Therefore, according to the present invention, because the measurement program is always related to the actual machining NC program, it is possible to obtain an optimum measurement program according to the NC program used in actual machining. In addition, because the results measured by such a measurement program are always fed back to the NC apparatus 25, it is possible to perform work control according to the measured results.

The results of the accuracy measured at every stage of the NC program are input to a work achievement analyzing means 22 shown in FIG. 1 via the measurement result analyzing means 33. The tool list and the actual machining NC program are also input to the work achievement analyzing means 22. The work information is analyzed, and the information under various conditions is classified and output into the respective databases 21A, 21B, 21C, 21D, and 21E for cutting conditions, tools, work history, machine accuracy, and the like. The present invention is characterized in that the machine accuracy database is provided. As used here, the term "machine accuracy" refers to the accuracy peculiar to the machine tool, and in general can be obtained from the actually measured machining accuracy and the machining conditions.

Figure 2:
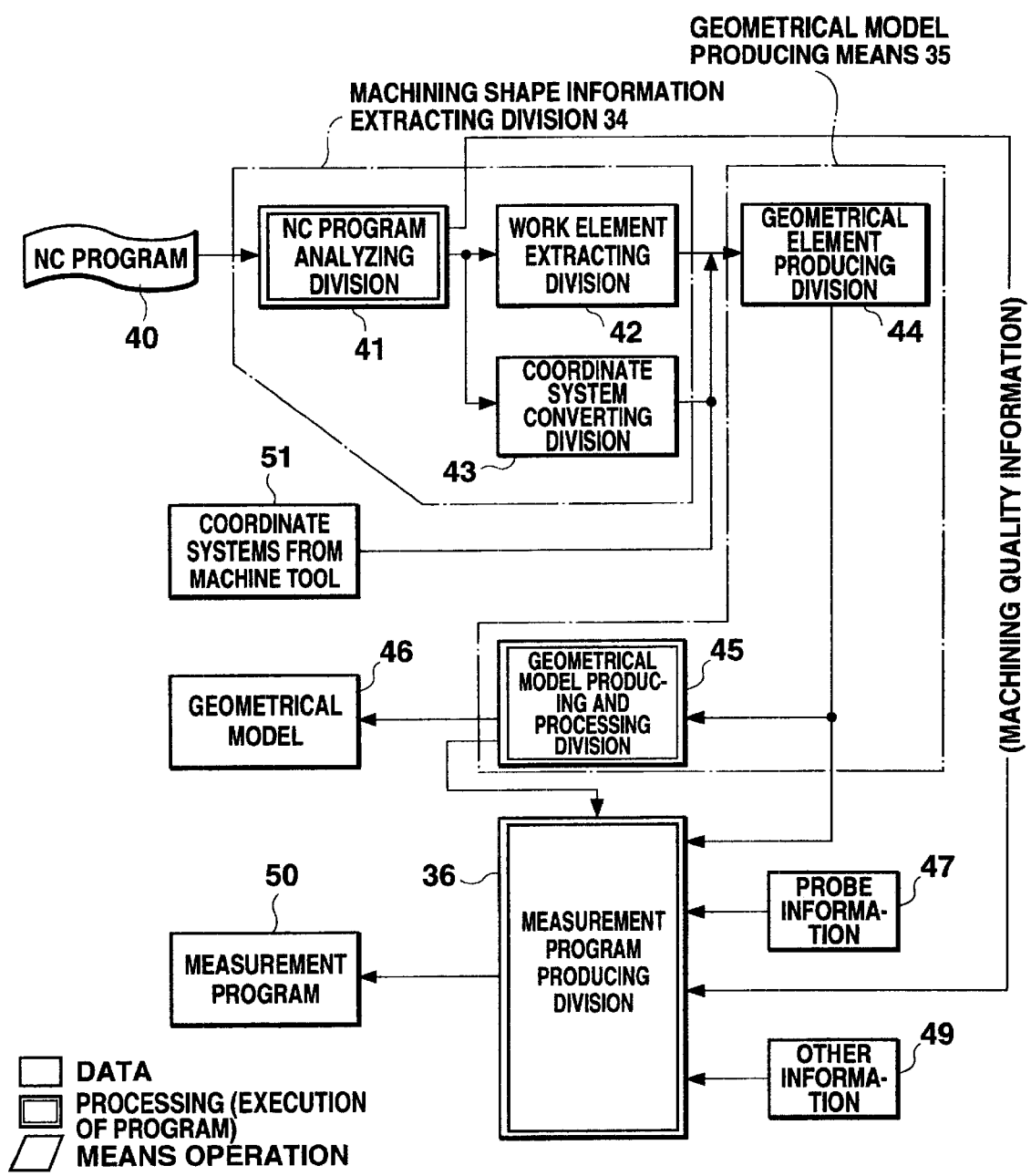
FIG. 2 is a block diagram showing an apparatus for producing a measurement program according to the present invention.

FIG. 2 shows detailed constitution of the measurement program producing division of the NC machine tool system described above (FIG. 1). In this embodiment, the measurement is carried out by taking a working element during NC machining as a basic unit. Timing of the measurement is just after the working element has been obtained by completing a series of operation elements. Naturally, the measurement may be carried out at the stage just after the completion of a process that is a combination of a plurality of working elements. For practical purposes, in an actual measurement program, timing of the measurement is determined so as to be just after completion of a working element or a process.

In FIG. 2, an NC program 40 is supplied to an NC program analyzing division 41 of a machining shape information extracting division 34. The NC program analyzing division 41 first divides the NC program into operation elements based on the tool data supplied separately and the NC program 40, and then supplies the information of the operation elements to a working element extracting division 42. The NC program analyzing division 41 extracts quality information from the NC program and outputs the extracted quality information to a measurement program producing division 36. The working element extracting division 42 combines a plurality of operation elements, and extracts working elements from the NC program, and outputs them. The NC program analyzing division 41 supplies coordinate data existing in the NC program to a coordinate system conversion division 43 to convert the coordinate systems prepared for NC machining to the three-dimensional coordinate systems for measurement. A list of the extracted working elements and a list of the converted coordinate systems are supplied to a geometrical element producing division 44 of the geometrical model producing division 35, and the working element designated by the NC program 40 is converted to a geometrical element in an ordinary three-dimensional coordinate system, and then output. Although in the example of the present embodiment, the geometrical element is further synthesized as a geometrical model in a geometrical model producing and processing division 45, and the geometrical model is supplied to a measurement program producing division 36, the conversion to the geometrical model is not always necessary with the present invention. The list of geometrical elements output from the geometrical element producing division 44 may be supplied to the measurement program producing division 36 intact. Further, the geometrical model 46 produced in the geometrical model producing and processing division 45 may be supplied to the measurement result analyzing means 33 as shown in FIG. 1.

The geometrical model or the list of the geometrical elements is supplied to the measurement program producing division 36, and probe information 47 of the measuring machine 31, machining quality information, and other necessary information 49 are supplied to the measurement program producing division 36. A measurement program 50 is produced based on these given input information and is supplied to the measurement control apparatus 32.

FIG. 2 shows schematic steps for producing the measurement program 50 from the NC program 40 in the present embodiment. The respective steps will be described in detail in the following.

First, details of the NC program analyzing division 41 for extracting operation elements will be described with reference to FIGS. 3 to 7.

Figure 3:
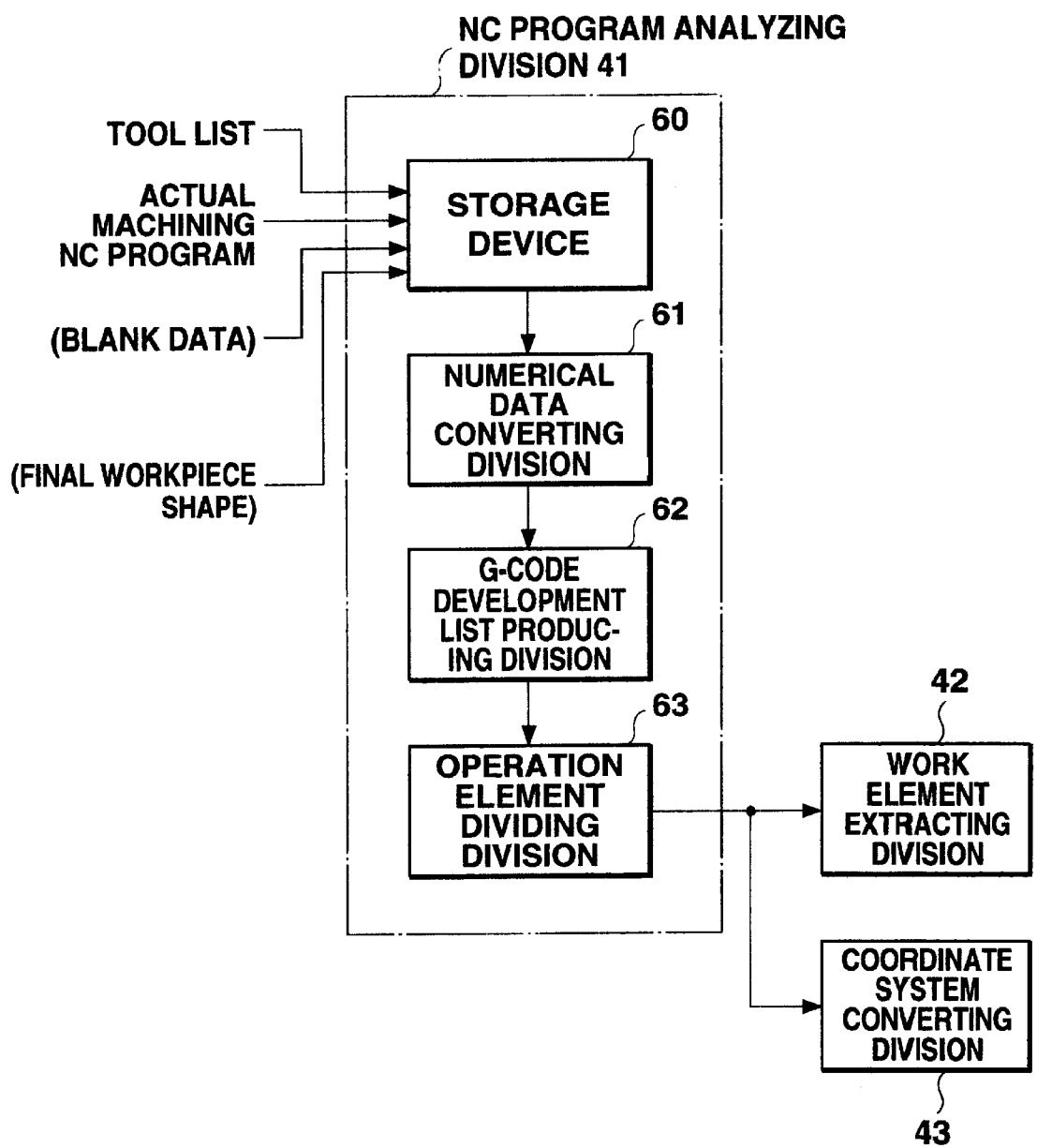
FIG. 3 is a block diagram showing a division for extracting machining shape information according to the present invention in the system shown in FIG. 2.

FIG. 3 exaggeratedly shows the respective components of the NC program analyzing division 41 in the machining shape information extracting division 34 (FIG. 2) according to the present invention. The actual machining NC program and the tool list are input to the NC program analyzing division 41 as described above. In addition, the blank data and the final workpiece shape are also input as necessary.

In the NC program analyzing division 41, the respective input data are stored in a storage device 60. The actual machining NC program is analyzed block by block, and is converted into numerical data by a numerical data conversion division 61. The respective data are registered as a G-code development list in a G-code development list producing division 62. In this case, when a plurality of operations are executed in one block as in a macro-program and a sub-program, the data are used to develop a basic command according to RS-274-D format, and then are registered as the G-code development list. Such G-code development is not always necessary in the present invention. In the present example, however, in order to process the actual machining NC program using a computer, the G-code development is adopted because of the easiness of the analysis.

In the NC program analyzing division 41, the continuous actual machining program is divided for every operation element in an operation element dividing division 63 with reference to the G-code development list.

Preferably, in an ordinary case, the division of the program into every operation element machining in the operation element dividing division 63 is executed, taking notice of sequence number (N number), tool indexing (T code), tool changing (M6), and optional stop (M01). In practice, because only one tool is used during the period from the tool changing to the next tool changing, such a division of a program into every operation element can be executed by noting of tool changing to divide operation elements. However, because in some cases a plurality of operation elements are performed using a single tool, such as, for example, when a plurality of holes before threading are drilled using one drill, it is preferable to also read out a tool path pattern in addition to the tool changing to reliably execute the division of a program for every operation element.

FIG. 4A and FIG. 4B show examples of actual machining NC programs used in the present embodiment. The program number is 00001. A special point of this program is that machining quality information (tolerance information) is written in the lines of 50, 51, 52, 58, 59, and 60. The slash symbols/on the respective lines are disregarded in executing the NC program.

Figure 5:
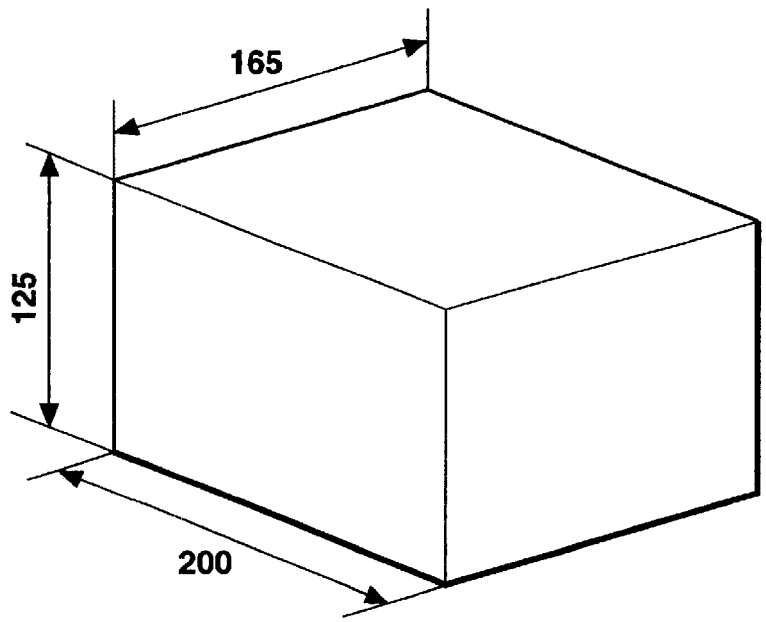
FIG. 5 is a figure showing a shape of a blank used to illustrate a preferred embodiment of the present invention.
Figure 6:
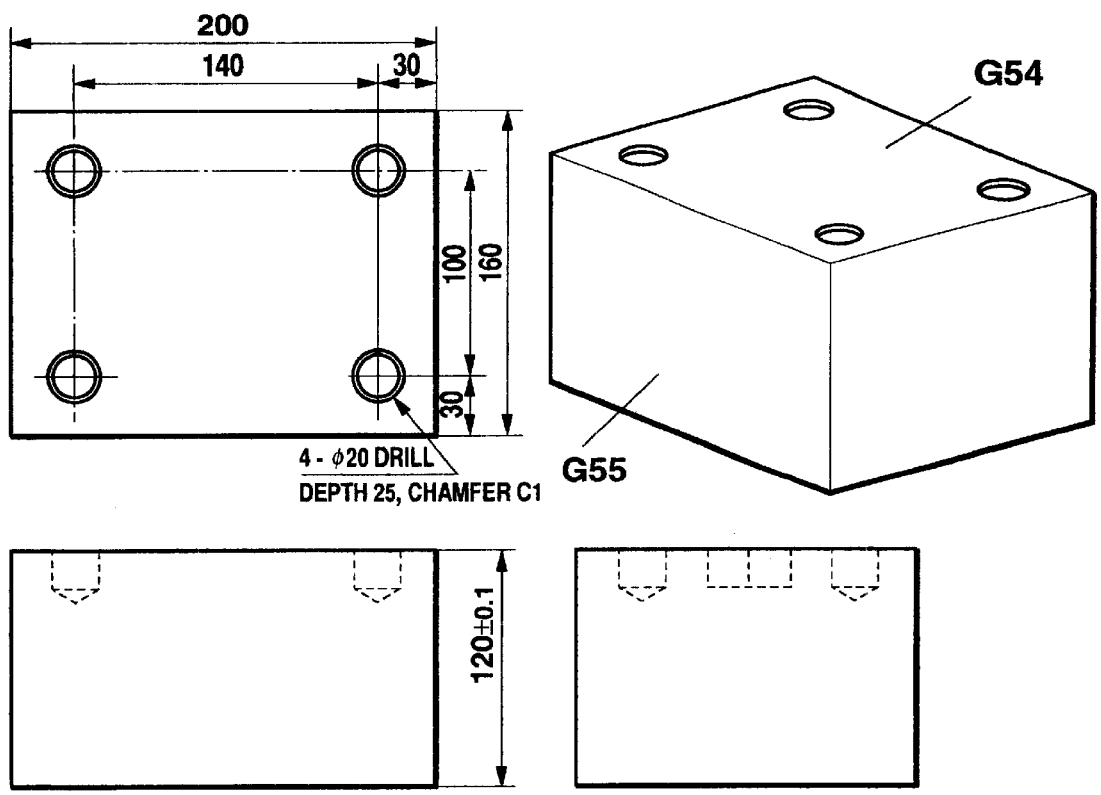
FIG. 6 is a figure showing a final shape of a workpiece used to illustrate the preferred embodiment.

FIG. 5 shows the shape of the blank to be machined by the actual machining NC program. FIG. 6 shows the final machined shape to be manufactured from the blank shown in FIG. 5. The blank data (including materials) and the final machined surface are supplied to the NC program analyzing division 41 as the data as described above. As shown in FIG. 6, in this machining, face milling of the upper surface is required.

For such machining operations, the NC program producing means 20 determines machining procedures, develops the machining procedures for operation elements, determines an operation tool for every operation element, and further determines cutting conditions for the respective tools.

FIG. 7 shows a tool list used in the program 00001. Respective tool numbers are shown by the T code, and tool data of the respective tools are listed as shown in FIG. 7. This tool list is supplied to the NC program analyzing division 41.

The measurement program producing division 36 creates the necessary measurement program 50 based on the required machining quality information input from the NC program analyzing division 41 and also based on the probe information 47 and the other information 49 as shown in FIG. 2, if necessary. In this case, referencing commands for comparing the required tolerances such as tolerances of holes, dimensional tolerances, or the like with the measured values are automatically determined. Necessary information other than theses tolerance information are as follows.

1. Information particular to measurement program
   (a) Program name
   (b) Program file name
   (c) File name of output result
   (d) Device for outputting result
   (e) Format for outputting result
   (f) Others (process control information, or the like)
2. Information particular to measuring machine
   (a) Setting of datum surface
   (b) Unit (mm/inch)
   (c) Travelling and measuring speed
   (d) Parameters of measuring operation
   (e) Probe (measurement value) information
   (f) Reference information
   (g) others (a master ball for calibrating a probe, or the like)
3. Information particular to setting of initial coordinate systems
   (a) Switching of automatic measurement and manual measurement
   (b) Calling of coordinate systems Because the respective information described above are not included in the NC program itself used in the present invention, an operator ordinarily inputs the information before machining is begun. For example, in the case of a measuring machine, because initial parameters are preset, it is unnecessary to particularly input the initial parameters individually. Furthermore, when the required values are different from the initial values, the initial values can easily be input by only selecting a prepared template having the initial values.

Thus, according to the present invention, the measurement program 50 can easily be produced by analyzing the NC program 40. FIG. 8A and FIG. 8B show a part of the measurement program produced by the measurement program producing method according to the present invention. A special point of this is that automatically produced tolerance information (quality information) is written in the lines of 72, 73, 74, 85, 86, 87, 98, 99, and 100.

The present invention is characterized in that a measurement program is produced from an NC program as described above, and that a measurement program closely related to actual machining operation can be obtained. It is also possible to improve the relationship between the NC machining program and the measurement program by feeding-back the actual machining shapes to the work control by the machine tool while measuring the machining shapes during actual machining operation by the measurement program.

Figure 9:
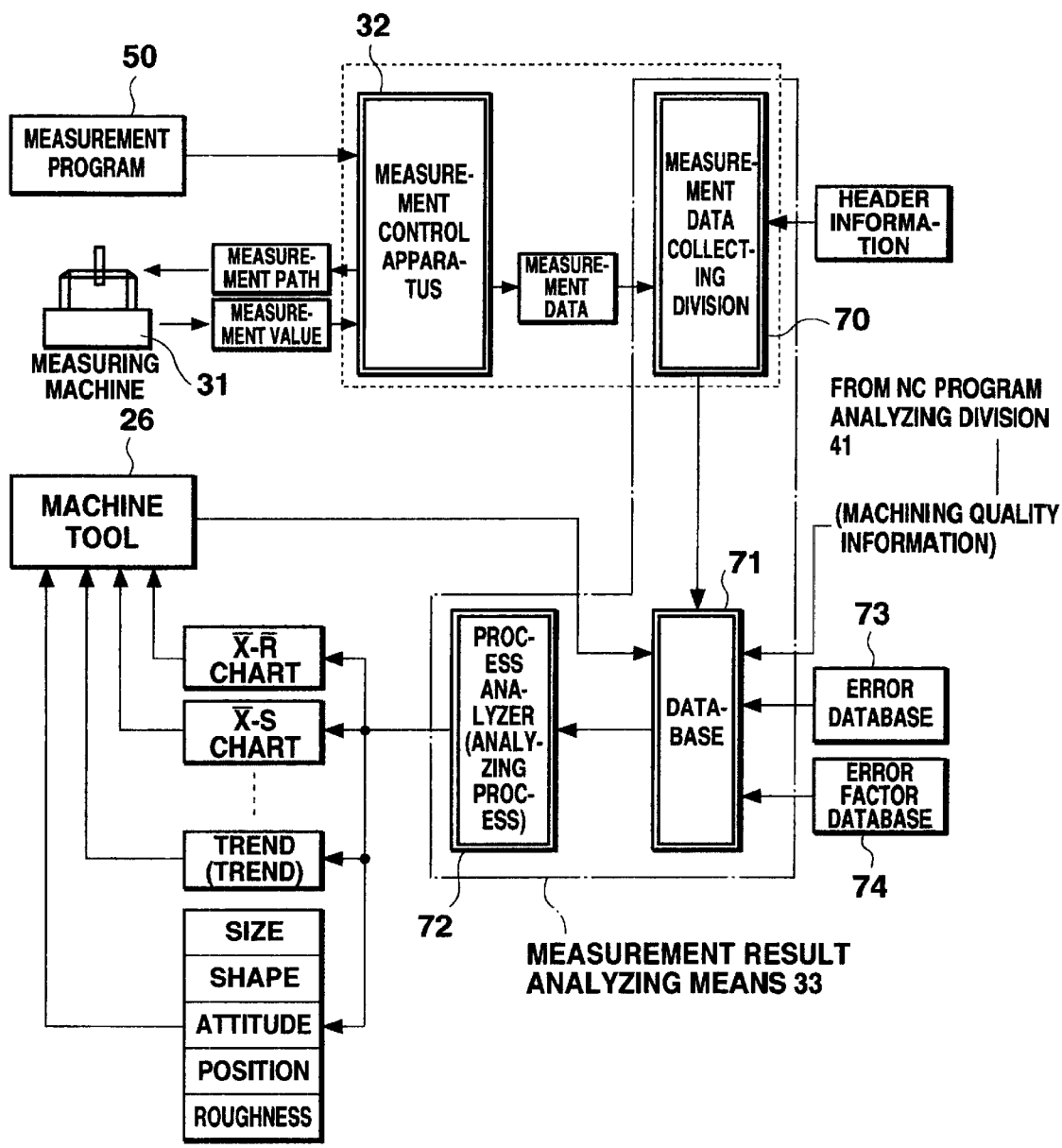
FIG. 9 is an explanatory figure showing the execution of the measurement program and the analyzing processes of the measured values according to the present invention.

FIG. 9 shows a state in which the measurement control apparatus 32 controls the measuring machine 31 using the measurement program 50. The measurement control apparatus 32 sends a command indicating measurement paths defined by the predetermined measurement program to the probe of the measuring machine 31. The probe automatically measures a machining shape at directed stages. Then, the measured values are sent from the measurement control apparatus 32 to a measurement data collecting division 70 as measurement data, and are stored in a database 71 after header information is added. The measurement result analyzing means 33 includes a process analyzer 72 together with the measurement data collecting division 70 and the storage database 71. The analyzed values of the measurement results can be fed back to the machine tool 26 to reflect the measurement results upon the following machining processes.

Figure 10:
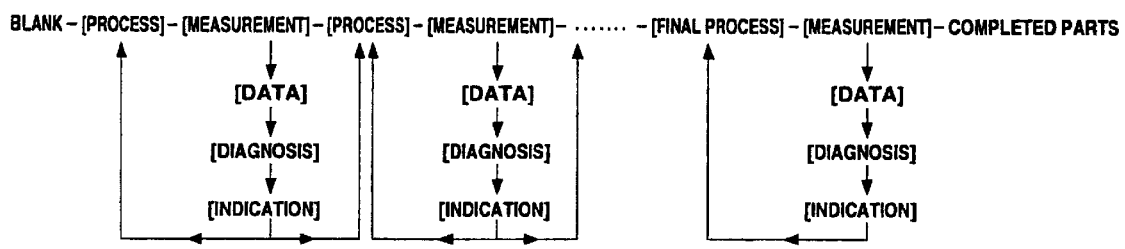
FIG. 10 is an explanatory figure showing the flow of the measurement data between respective processes.

FIG. 10 shows the flow of the measurement results at each machining process. In the present embodiment, each measurement operation is carried out in any selected process, and the measurement results are immediately analyzed by the process analyzer 72, and are fed back to the work control in the following process or the preceding process, as necessary.

Again, FIG. 9 will be described in further detail.

When any one of the results measured by the measuring machine 31 exceeds the tolerance limit or exists within the dangerous range, the measurement result analyzing means 33 immediately informs the machine tool 26 of this measurement result as error measurement data, and gives an instruction to the machine tool 26 to temporarily stop machining operation, to change cutting amount at the following machining process, or to take other appropriate action.

The measurement control apparatus 32 sends ordinary data to the measurement data collecting division 70. Header information such as the following are added to the measured data.

1. Information for header
   (a) Title of header
   (b) File name of header
   (c) Date (data producing date)
   (d) Names of parts
   (e) Unit
   (f) Number of measurement items
2. Information for measurement items
   (a) Names of measurement items
   (b) Names of features
   (c) Value
   (d) Upper allowable value
   (e) Lower allowable value
   (f) UCL (Upper Control Limit)
   (g) LCL (Lower Control Limit)
3. Information for machining process
   (a) Error factor
   (b) Information related to errors
   (c) Environment temperature The process analyzer 72 executes statistics, analysis, and diagnosis using the measurement data stored in the database 71, and produces control charts such as an $\overline{X}$-$\overline{R}$ chart, an $\overline{X}$-S chart or a trend, and outputs the results to the NC apparatus 25 of the machine tool 26.

Figure 11:
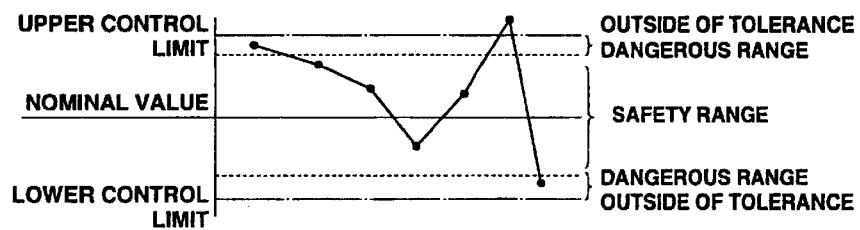
FIG. 11 is an explanatory diagram showing an example of measured results.

FIG. 11 is a control chart showing the relationship between the measurement values and the nominal value.

When the measurement value exceeds the upper limit or the lower limit of the tolerance, such a situation is sent to the NC apparatus 25 as a value outside the tolerance. Further, when the measurement value is within the dangerous range beyond the safety range near the tolerance limit, checking of the preceding process or notification to the next process is sent as a dangerous state.

With the present invention, because measurement results can be obtained during machining easily and in real time, it is possible to immediately indicate the measurement results to the following processes in order to easily feed the results to cutting conditions such as feedrate of a tool or the like at the next process.

In addition, control data obtained from the process analyzer 72 are analyzed by well known diagnosis programs such as FMEA (Failure Mode and Effect Analysis) and FTA (Failure Tree Analysis). The likelihood ratio of these diagnosis programs can be improved by successively determining the modification and change of the machining program and the measurement program according to the present invention. Furthermore, the power of the main spindle is collected as data in time series based on the motion dynamics of the machine tool 25, and is analyzed by spectrum analysis using FFT (Fast Fourier Transform) and other hardware. Accordingly, higher harmonics of the waveform can be digitized and their variance can be calculated. In this case, it is possible to judge a drop of tool sharpness, wear of the tool, wrong chucking of a workpiece, and accuracy of the machine tool. It is preferable that these judging functions are included in the diagnosis programs such as FTA of the process analyzer described above.

Furthermore, information about a state of the machine tool 26 is supplied to the database 71. In addition, various errors (except required tolerances) from an error database 73 and an error factor database 74 or error factor diagnosis program data are supplied to the database 71. On the basis of these data, the process analyzer 72 can supply not only the analyzed information described above but also respective elements of the workpiece shape, such as a size, a shape, an attitude, a position or surface roughness, to the machine tool 26 as data. Consequently, the machine tool 26 can optimally carry out the working control at the next process based on these control data.

Effects of the Invention

As described above, the present invention makes it possible in NC-machining for a measurement program to directly be obtained from an actual machining NC program, and optimum and detailed measurement results are easily obtained in connection with required quality at any machining stage.

Further, because the measurement program according to the present invention does not require complicated automatic programming as in the known art, the measurement program can be produced regardless of a size of the NC program. Further, because the measurement program always corresponds to the actual machining NC program, when any conditions including required quality are modified, other conditions can be modified correspondingly. Therefore, a work control by a machine tool can be aided by both of the machining program and the measurement program in connection with each other.

Further, the measurement program according to the present invention can function for not only the machine tool adopting the NC machining program, but also other machine tools in the same manner. In addition, because the respective measurement programs are constructed as an assembly of modularized measurement programs at any stages for any of operation elements, working elements or processes, it is possible to produce a measurement program having very high flexibility. In addition, these measurement program always can include the know-how necessary for measurements in the latest state. The measurement program can be applied to other machine tools, while retaining acquired know-how. Therefore, there is such a advantage that the measurement program has not only superior flexibility but also wide expandability.

The measurement results obtained by using the measurement program according to the present invention can in all cases be fed to the next stage or the preceding stage, and can provide useful measurement data as work control data.

What is claimed is:

1. A method for producing an NC program for automatically controlling a machine tool to machine a workpiece comprising a step of:

writing machining quality information into the NC program, the machining quality information regarding machining quality after machining a workpiece.

2. A method for producing an NC program according to claim 1, wherein the machining quality information includes required tolerance information.

3. A method for producing an NC program according to claim 1, wherein the machining quality information includes required surface roughness information.

4. An NC machining system comprising the steps of:

producing a measurement program for measuring machining quality of a workpiece machined by a machine tool using a measuring machine through analyzing an NC program for carrying out machining control of the machine tool for the workpiece;

measuring machining quality of the workpiece using the produced measurement program and the measuring machine; and judging machining quality of the workpiece by comparing the measurement results of machining quality of the workpiece measured by the measuring machine and machining quality information included in the NC program, the machining quality information regarding machining quality after machining a workpiece.

5. An NC machining system according to claim 4, wherein the machining quality information includes required tolerance information.

6. An NC machining system according to claim 4, wherein the machining quality information includes required surface roughness information.

7. An NC machining apparatus comprising:

means for producing a measurement program for measuring machining quality of a workpiece machined by a machine tool using a measuring machine through analyzing an NC program for carrying out machining control of a machine tool for a workpiece;

a measuring machine for measuring machining quality of a workpiece using the produced measurement program; and means for judging machining quality of the workpiece by comparing the measurement results of machining quality of the workpiece measured by the measuring machine and required machining quality information included in the NC program, the machining quality information regarding machining quality after machining a workpiece.

8. An NC machining system according to claim 4, further comprising the step of:

determining a traveling path of a measuring probe of the measuring machine.

* * * * *